(12) United States Patent
Williamson

(10) Patent No.: US 10,443,137 B2
(45) Date of Patent: Oct. 15, 2019

(54) HYDROGEN GAS GENERATOR SYSTEM

(71) Applicant: CLEAN POWER HYDROGEN LIMITED, Streamstown (IE)

(72) Inventor: Nigel Williamson, Dronfield (GB)

( * ) Notice: Subject to any disclaimer, the term of this patent is extended or adjusted under 35 U.S.C. 154(b) by 645 days.

(21) Appl. No.: 14/785,313

(22) PCT Filed: Apr. 15, 2014

(86) PCT No.: PCT/EP2014/057652
§ 371 (c)(1),
(2) Date: Oct. 16, 2015

(87) PCT Pub. No.: WO2014/170337
PCT Pub. Date: Oct. 23, 2014

(65) Prior Publication Data
US 2016/0090657 A1   Mar. 31, 2016

(30) Foreign Application Priority Data

Apr. 16, 2013 (GB) .................................. 1306864.8

(51) Int. Cl.
*C25B 1/08* (2006.01)
*C25B 11/02* (2006.01)
(Continued)

(52) U.S. Cl.
CPC ................ *C25B 1/08* (2013.01); *C25B 1/06* (2013.01); *C25B 9/06* (2013.01); *C25B 9/063* (2013.01);
(Continued)

(58) Field of Classification Search
CPC .................................................. C25B 1/04–08
See application file for complete search history.

(56) References Cited

U.S. PATENT DOCUMENTS 4,339,324 A    7/1982  Haas
2002/0100681 A1  8/2002  Kirk et al.
(Continued)

FOREIGN PATENT DOCUMENTS

WO   WO-98/09001 A1    3/1998
WO   WO-9809001 A1 *   3/1998 ............... C25B 1/04
WO   WO-2010/109234 A1  9/2010

*Primary Examiner* — Nicholas A Smith
(74) *Attorney, Agent, or Firm* — West & Associates, A PC; Stuart J. West

(57) ABSTRACT

A hydrogen gas generator system comprises a reactor stack adapted to perform electrolysis on water in an electrolyte solution, the reactor stack comprising a plurality of spaced apart electrode plates and electrolyte solution disposed between the plates, each plate having an upper outlet aperture and a lower inlet aperture to allow movement of electrolyte solution across the plates. A separator is configured to receive a mixture of gas and electrolyte solution from a top of the reactor stack and separate the gas from the electrolyte solution. A gas outlet configured to remove gas from the separator, and an electrolyte solution inlet configured to return electrolyte solution from the separator to a bottom of the reactor stack. The system comprises a pump configured to pump electrolyte solution in a circuit from the electrolyte solution outlet of the separator/reservoir, through the reactor stack at velocity, and back to the separator/reservoir, and in which in the upper and lower apertures are sufficiently large to allow pumped flow through the reactor stack.

15 Claims, 4 Drawing Sheets

(51) Int. Cl.
*C25B 15/02* (2006.01)
*C25B 15/08* (2006.01)
*C25B 1/06* (2006.01)
*C25B 9/06* (2006.01)
*C25B 9/20* (2006.01)
*C25B 11/04* (2006.01)

(52) U.S. Cl.
CPC ................ *C25B 9/20* (2013.01); *C25B 9/203* (2013.01); *C25B 11/02* (2013.01); *C25B 11/0447* (2013.01); *C25B 11/0452* (2013.01); *C25B 15/02* (2013.01); *C25B 15/08* (2013.01); *Y02E 60/366* (2013.01)

(56) References Cited

U.S. PATENT DOCUMENTS

| | | | |
|---|---|---|---|
| 2012/0067021 A1* | 3/2012 | Aggelopoulos | C25B 1/08 60/39.12 |
| 2014/0262819 A1* | 9/2014 | Forbes | B01D 46/0039 205/628 |

* cited by examiner

Fig. 5. (External face)
Fig. 6. (internal face)
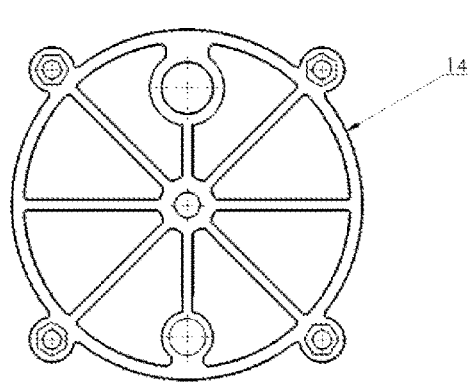
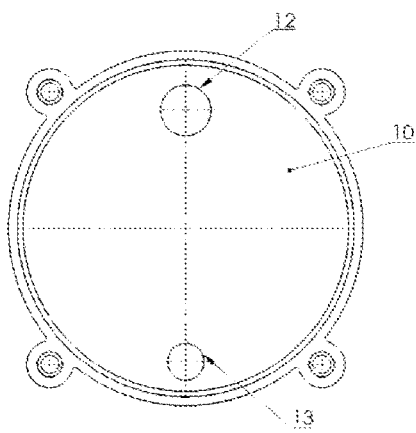
Fig. 7
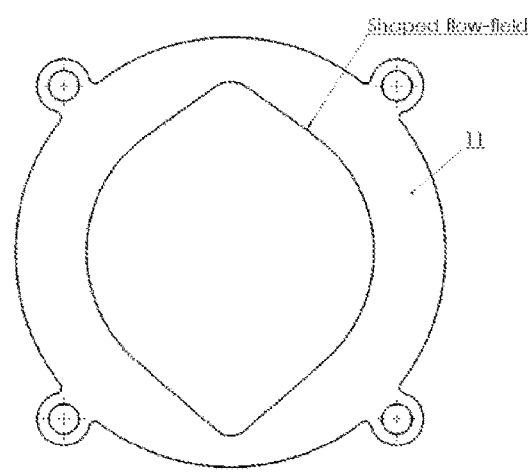

HYDROGEN GAS GENERATOR SYSTEM

BACKGROUND TO THE INVENTION

There are numerous hydrogen generator technologies on the market throughout the world, of various types and technologies. The technical field of this invention is concerned with the simplest and least expensive of high-volume gas generation technologies, namely mixed hydrogen and oxygen co-generation by electrolysis. This involves the use of closely spaced electrodes, between which is an electrolyte solution of either acidic or alkaline nature which catalytically facilitates the water-splitting reaction which, in turn generates the two gases. Such systems exist widely throughout the world, where they are used in welding/brazing/cutting equipment, on-board vehicles as a fuel enhancement and for numerous applications such as jewelry and dental equipment manufacture, where very fine, high-energy heat sources are required. All such systems, however, tend to suffer from one or many of a number of problems which occur naturally and deleteriously affect performance. These include electrolyte solution displacement by the generated gas, which reduces the surface area available for the reaction, bubble blinding, stray electrolysis (current leakage), and overheating due to overpotential between cell plates.

It is an object of the invention to overcome at least one of the above-referenced problems.

STATEMENTS OF INVENTION

A hydrogen gas generator system comprising:
a reactor stack adapted to perform electrolysis on an electrolyte solution, the reactor stack comprising a plurality of spaced apart electrode plates adapted to receive (or having) electrolyte solution disposed between the plates, each plate having an upper outlet aperture and a lower inlet aperture to allow movement of electrolyte solution across the plates;
a separator/reservoir configured to receive a mixture of gas and electrolyte solution from a top of the reactor stack and separate the gas from the electrolyte solution;
a gas outlet configured to remove gas from the separator/reservoir; and
an electrolyte solution inlet configured to return electrolyte solution from the separator/reservoir to a bottom of the reactor stack,
characterised in that the system comprises a pump configured to pump electrolyte solution in a circuit from the electrolyte solution inlet, through the reactor stack, and back to the separator/reservoir, and in which in the upper and lower apertures are sufficiently large to allow pumped flow of electrolyte solution through the reactor stack. It is desirable to create significant velocity in the electrolyte flow across the cell plates in the stack, in order to break the generated gas bubbles loose from the surface of the electrodes.

It was found that, despite information to the contrary, pumping the electrolyte solution around the integrated generator system improved performance by improving the displacement of the bubbles, thereby significantly reducing the bubble-blinding problems, and by providing a means by which excess heat could simply be removed.

The invention also relates to a method of generating hydrogen gas which method employs a hydrogen gas generation system of the invention, the method comprising the steps of pumping an aqueous electrolyte solution through the reactor stack, across the charged plates and to the separator, separating generated gasses from the electrolyte solution in the separator, and pumping the electrolyte back to the reactor stack though the electrolyte inlet.

Suitably, the electrolyte solution is pumped around the recirculating system at ambient system pressure. Typically, the electrolyte solution is pumped around the system at a flow rate of at least 3 liters/minute, though this is dependent upon the rate of gas generation, and will be different for each variant. Ideally, the pump is configured to pump electrolyte across the plates at a flow-front velocity of at least 5 cm/minute, 10 cm/minute, 15 cm/minute, 20 cm/minute, 23 cm/minute, or at least 25 cm/minute.

Suitably, the pump is mounted between an outlet of the separator/reservoir and the reactor stack, typically in the electrolyte solution inlet. The Applicant has discovered that it is better to pump a more uniform, higher density liquid than one in which there is a significant quantity of gas. Where large quantities of gas exist in the pumped fluid, there is a much increased risk of gas build-up in the pump head and consequential loss of flow.

Preferably, the pump is a centrifugal pump, though displacement pumps can also be used, examples of which will be well known to those skilled in the art.

In the electrolytic cells forming part of the gas generation system of the invention, the electrolyte solution flows from the bottom of the cell, picking up the tiny bubbles of gas (generally forming a mixture of oxygen and hydrogen) as they are generated, and exits at the top of the cell, now increased in volume by the gas borne on the flow. The flow then enters a separation reservoir in which the electrolyte solution is contained, where the bubbles of hydrogen and oxygen separate out of the solution, generally by gravity. The gas typically leaves through an orifice at the top of the reservoir, while the electrolyte solution is generally re-circulated through the system and back through the stack previously described.

Preferably, the upper apertures in the reactor stack (and in each electrode plate) are larger than the lower apertures. This allows for the volume increase due to electrolyte solution at the top of the plates carrying generated gasses (generally oxygen and hydrogen). Typical stacks world-wide have plates with small communication holes drilled through top and bottom which are of substantially similar size, and too small to allow pumped flow through the stack. Suitably, the upper aperture has an area at least 50%, 60%, 70%, 80%, 90%, or 100% greater than the area of the lower aperture. Suitably, the apertures are circular, for ease of manufacture, though other shapes may also be considered. In the current system as prototyped, the lower orifice diameter is 10-20 mm, typically 15 mm, while the upper is 15-30 mm, typically 20 mm. Typically, each upper aperture is disposed adjacent a top of each electrode plate and is in fluid communication with the spacing between the plates. Suitably, each lower aperture is disposed adjacent a bottom of each electrode plate and is in fluid communication with the spacing between the plates. Suitably, the upper apertures are aligned along a horizontal axis to facilitate transfer of fluid (electrolyte liquid and gas) out of the top of the reactor stack. Suitably, the reactor stack comprises an outlet manifold configured to receive pumped fluid from the upper apertures. Typically, the outlet manifold is a dedicated outlet (i.e. only transfers fluid out of the reactor stack). Typically, the electrolyte inlet is a dedicated inlet (i.e. only transfers fluid out of the reactor stack).

Preferably, the reactor stack comprises a plurality of electrode plates separated by sealing spacers which define the distance between the plates and a path for movement of electrolyte solution between adjacent plates from the lower aperture to the upper aperture. Each pair of plates separated by a spacer is referred to as an electrolytic cell. Typically, the reactor stack comprises 1-50, 1-40, 1-30, 1-20 or 1-10 electrolytic cells. Suitably, the spacer is configured to provide a plate separation of 0.25 to 2 mm. A spacing of this narrow dimension is particularly advantageous because it facilitates high velocity flow across the plates which helps remove gas bubbles from the plates and thereby increases the efficiency of the electrolysis operation. It also allows for a reduction in the concentration of the electrolyte which, in turn, improves efficiency by limiting current leakage. In one preferred embodiment, the spacer is configured to provide a spacing between the plates of 0.25 to 1.5 mm, 0.5 to 1.25 mm, 0.7 to 1.0 mm, and ideally about 0.5 to 0.9 mm. Preferably, the spacer is formed of a resiliently deformable material, for example rubber, EPDM or combination elastomer/polymer material of approximate hardness on the Shore-A scale of between 60 and 80. Typically, each spacer functions both as a gasket and as a flow-field for the passage of electrolyte across the plates.

As indicated above, it was found that shaping and sizing the sealing spacers and providing flow-holes of sufficient size in order to allow for a pumped flow through the stack, offered the opportunity to pump the flow at high velocity across the cell plates and thereby attain the benefits briefly described above.

In one embodiment, the electrode plates are monopolar plates. In another embodiment, the electrode plates are bi-polar plates.

In one embodiment, the electrode plates are contact electrode plates. Contact electrode plates are mono-polar plates, in between which are bi-polar plates, in multiples appropriate to the requisite Voltage for cell reaction activity, each space being a sub-division of the supply Voltage in a serial stack. (e.g., in a 12 Volt system, between each contact electrode plate, there might be 4, 5 or 6 spacers defining 4, 5 or 6 cells, each of 23.0V or 2.4V or 2.0V respectively.)

In another embodiment, the electrode plates (or reactor stack) comprise an electrically parallel reactor stack. In such reactors, the plates are fed with an appropriately low Voltage, with each plate of alternate polarity.

Preferably, one pair or more of the plates are stainless steel cell plates, which may be coated with nickel or oxide of nickel or other metal oxide.

In order to remove excess heat, which is preferable for the integrity of the stack and other system components, from the circulating electrolyte solution, should the system, for example, be housed in an enclosure which allows limited access to cooling air, it can be first circulated around a cooling system which may be aloof from the main enclosure, or may be attached to its outside, dependent upon siting of the system. This cooling 'loop' may be in the flow between the reservoir and the stack, or could be a secondary, independent flow loop which simply circulates the electrolyte solution through a radiator or heat exchanger by use of a second circulating pump. Thus, in one embodiment, the system comprises a cooling loop configured to remove heat from the electrolyte solution. The cooling loop may be located in the pumped electrolyte solution circuit between the separator/reservoir and the stack, or in a separate circuit. In one embodiment, the cooling loop comprises a conduit having an inlet and outlet in fluid communication with the reservoir, an intermediate portion distanced from reservoir, and a pump adapted to pump electrolyte through the cooling loop.

Suitably, the system comprises a reservoir of liquid and means for passing the gas removed from the separator through the reservoir of liquid, preferably by bubbling the gas through the liquid. Typically, an outlet of the gas inlet is submerged within the reservoir of liquid. Suitably, the liquid is water. Thus, the mixed gases flow from the top of the reservoir, in which they have been separated from the electrolyte solution, through tubes to a 'bubbler' or series of bubblers which remove from the gas stream any carried over electrolyte solution which may be borne on the flow. From the last of the bubblers in the flow-path, the gas flows to its point of use.

The term "electrolyte solution" as used herein should be understood to mean an aqueous solution of one or more electrolytes, for example an aqueous solution of potassium hydroxide. Other suitable electrolytes include baking soda, potassium hydroxide, sodium hydroxide, citric acid, vinegar, sulphonic acid, etc. Typically, the electrolyte solution has a concentration of 0.05 to 5% (w/v), preferably 0.5 to 2.5% (w/v). When the spacing between the plates is 0.5-2 mm, suitably 0.5 to 0.9 mm, the electrolyte solution typically has a concentration of 0.03 to 0.15%, preferably 0.05 to 1.0% (w/v).

In situations where the gases are to be combusted at a nozzle in the system, it is necessary to have the system at a nominal pressure of approximately 1 bar(g) in order to ensure a jet of adequate velocity to avoid back-flash. (Inclusion of a flash-back arrestor in such a system is also strongly to be advised.) This, in turn, requires the system (stack, reservoir, bubblers, pumps and radiators/heat exchangers) to be capable of withstanding system pressures, with substantial safety margins. A benefit of pressurisation of such a system is the reduction in volume of the generated gas, proportionate to the pressure attained.

Systems for use on automobiles and heavy goods vehicles, etc., however, do not need to be pressurised to any extent greater than that generated by resistance in the system to gas flow, as it is delivered to the inlet manifold of an engine which sits, during use, at a negative pressure (partial vacuum). In this situation, it is advisable to incorporate a flash-back arrestor at a point close to the inlet manifold to avoid ignition by engine back-fire.

The electrical characteristics of the stack are also important to efficiency of the gas release reaction during electrolysis. A typical stack suffers from what is commonly referred to as 'current leakage', where the electrical flow is unevenly distributed through the stack due to the conductivity of the electrolyte solution. In this situation, the current is induced to 'jump' from the positive terminal to the negative terminal, thereby diminishing the current taken to power the bi-polar plates which sit, evenly spaced, between the contact (terminal) plates. It has been discovered by the inventor that this phenomenon can be substantially addressed by reducing the size of the gap between metal plates, with an associated reduction in concentration of the electrolyte solution. In this arrangement, where the gap between plates is around 0.5 mm, and a Potassium Hydroxide (KOH) electrolyte solution is mixed at a thin concentration of around 5 grammes per liter of pure water (0.5%), a significant improvement in electrolysis efficiency is obtained.

A second, yet more efficient approach to solving the current leakage problem is to assemble the stack in such a way as to make alternate plates carry opposite polarity, ensuring that the Voltage across each pair is of an appropriate value (sub 3V). In this arrangement, the current is drawn only to its nearest plate of opposite electrical polarity, and is not drawn away to other plates in the stack.

A stack of this design has been found to be as much as 50% more efficient than typical stacks which are 'series wired', though obtaining a current of sufficient Amperage at such a low Voltage presents its own difficulties. These have largely been overcome in the course of the system development programme, but give rise to added complexity and associated higher costs.

In one embodiment of this invention, the electric current to each cell is provided to neighbouring metal cell plates in such a way as to alternate polarity from plate-to-plate, said current being supplied at appropriate low Voltage by any means In a second embodiment, electric current is provided to contact plates which are interspaced outside bi-polar plates in a 'serial' configuration, whereby the Voltage is evenly shared between each cell, as a subdivision of the supply Voltage.

The invention also relates to a welding, brazing or cutting device comprising a hydrogen gas generating system according to the invention.

The invention also relates to a flame polishing device comprising a hydrogen gas generating system according to the invention.

The invention also relates to a vehicle comprising a combustion engine and hydrogen generating system according to the invention configured to provide hydrogen gas or a mixture of hydrogen and oxygen gas, to the combustion engine. Typically, the vehicle is an automobile.

The invention also relates to a vehicle comprising a rocket propulsion system and hydrogen generating system according to the invention configured to provide hydrogen gas or a mixture of hydrogen and oxygen gas, to the rocket propulsion system. Typically, the vehicle is an aircraft, a rocket, a missile, or a spacecraft.

The invention also relates to a hydrogen gas generating system comprising a reactor stack having at least two electrode plates adapted to perform electrolysis on an electrolyte solution disposed between the electrode plates and generate oxygen and hydrogen gases, the reactor stack comprising a base having an inlet for electrolyte solution and a top having an outlet for a mixture of electrolyte solution and hydrogen/oxygen gas, wherein each electrode plate comprises an upper aperture and a lower aperture that are sufficiently large to allow pumped flow of electrolyte solution through the plates, and wherein the upper aperture is larger than the lower aperture.

Typically, the plates are separated by a spacer adapted to provide a spacing between the plates of 0.25 to 2 mm. Typically, the spacer is configured to abut a periphery of the plates and which defines the distance between the plates and a path for movement of electrolyte solution between adjacent plates from the lower inlet aperture to the upper outlet aperture.

The invention also provides a reactor stack suitable for use in a hydrogen gas generator system and adapted to perform electrolysis on an electrolyte solution, the reactor stack comprising a plurality of spaced apart electrode plates having an upper outlet aperture and a lower inlet aperture that are sufficiently large to allow pumped flow through the reactor stack, the plates being separated by sealing spacers which define the distance between the plates and a path for movement of electrolyte solution between adjacent plates from the lower inlet aperture to the upper outlet aperture.

Preferably, the upper apertures in the reactor stack (and in each electrode plate) are larger than the lower apertures. This allows for the volume increase due to electrolyte solution at the top of the plates carrying generated gasses (generally oxygen and hydrogen). Typical stacks world-wide have plates with small communication holes drilled through top and bottom which are of substantially similar size, and too small to allow pumped flow through the stack. Suitably, the upper aperture has an area at least 50%, 60%, 70%, 80%, 90%, or 100% greater than the area of the lower aperture. Suitably, the apertures are circular, for ease of manufacture, though other shapes may also be considered. In the current system as prototyped, the lower orifice diameter is 10-20 mm, typically 15 mm, while the upper is 15-30 mm, typically 20 mm. Typically, each upper aperture is disposed adjacent a top of each electrode plate and is in fluid communication with the spacing between the plates. Suitably, each lower aperture is disposed adjacent a bottom of each electrode plate and is in fluid communication with the spacing between the plates. Suitably, the upper apertures are aligned along a horizontal axis to facilitate transfer of fluid (electrolyte liquid and gas) out of the top of the reactor stack. Suitably, the reactor stack comprises an outlet manifold configured to receive pumped fluid from the upper apertures. Typically, the outlet manifold is a dedicated outlet (i.e. only transfers fluid out of the reactor stack). Typically, the electrolyte inlet is a dedicated inlet (i.e. only transfers fluid out of the reactor stack).

Preferably, the reactor stack comprises a plurality of electrode plates separated by sealing spacers which define the distance between the plates and a path for movement of electrolyte solution between adjacent plates from the lower aperture to the upper aperture. Each pair of plates separated by a spacer is referred to as an electrolytic cell. Suitably, the spacer is configured to provide a plate separation of 0.25 to 2 mm. A spacing of this narrow dimension is particularly advantageous because it facilitates high velocity flow across the plates which helps remove gas bubbles from the plates and thereby increases the efficiency of the electrolysis operation. It also allows for a reduction in the concentration of the electrolyte which, in turn, improves efficiency by limiting current leakage. In one preferred embodiment, the spacer is configured to provide a spacing between the plates of 0.25 to 1.5 mm, 0.5 to 1.25 mm, 0.7 to 1.0 mm, and ideally about 0.5 to 0.9 mm. Preferably, the spacer is formed of a resiliently deformable material, for example rubber, EPDM or combination elastomer/polymer material of approximate hardness on the Shore-A scale of between 60 and 80. Typically, each spacer is annular in shape and ideally abuts a periphery of each adjacent electrode plate.

In one embodiment, the electrode plates are contact electrode plates. Contact electrode plates are mono-polar plates, in between which are bi-polar plates, in multiples appropriate to the requisite Voltage for cell reaction activity, each space being a sub-division of the supply Voltage in a serial stack. (e.g., in a 12 Volt system, between each contact electrode plate, there might be 6 spacers defining 6 cells, each of 2V.)

In another embodiment, the electrode plates (or reactor stack) comprise an electrically parallel reactor stack. In such reactors, the plates are fed with an appropriately low Voltage, with each plate of alternate polarity.

Preferably, one pair or more of the plates are stainless steel cell plates, which may be coated with nickel or oxide of nickel or other metal oxide.

Typically, the upper outlet apertures are larger than the lower inlet apertures. Suitably, the upper aperture has an area at least 50%, 60%, 70%, 80%, 90%, or 100% greater than the area of the lower aperture. Suitably, the apertures are circular.

Suitably, the spacer is configured to provide a plate separation of less than 2 mm, and in which the electrolyte solution comprises an aqueous solution of electrolyte solution salt having a concentration of less than 1.0% (w/v).

The invention also relates to a method of generating hydrogen gas which method employs a hydrogen gas generation system of the invention, the method comprising the steps of pumping an aqueous electrolyte solution through the reactor stack, across the charged plates and to the separator, separating generated gasses from the electrolyte solution in the separator, and pumping the electrolyte back to the reactor stack though the electrolyte inlet.

Typically, the electrolyte solution is pumped around the system at a flow rate of at least 3 liters/minute, though this is dependent upon the rate of gas generation, and will be different for each variant. Ideally, the pump is configured to pump electrolyte across the plates at a flow-front velocity of at least 5 cm/minute, 10 cm/minute, 15 cm/minute, 20 cm/minute, 23 cm/minute, or at least 25 cm/minute.

BRIEF DESCRIPTION OF THE FIGURES

The invention will be more clearly understood from the following description of an embodiment thereof, given by way of example only, and with reference to the accompanying drawings in which:

FIG. 5 is a view of an external face of an end plate of the reactor stack of the invention;

FIG. 6 is a view of an internal face of the end plate of FIG. 5;

FIG. 7 is a view of a spacer forming part of a reactor stack of the invention;

DETAILED DESCRIPTION OF THE INVENTION

Figure 1:
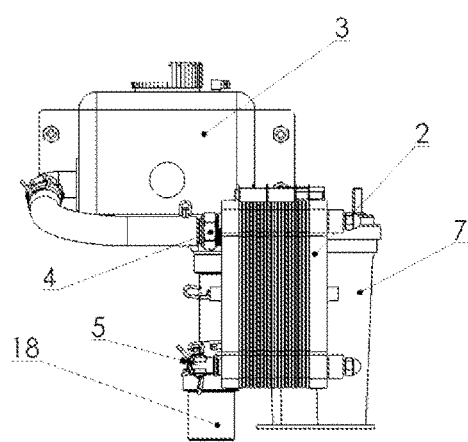
FIG. 1 is a view, from the front, of a hydrogen gas generator system of the present invention.
Figure 2:
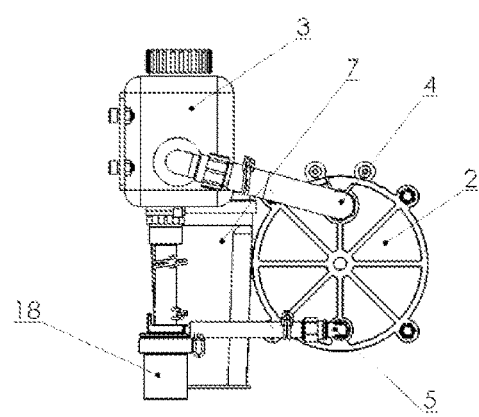
FIG. 2 is a view, from the side, of the system of FIG. 1.
Figure 3:
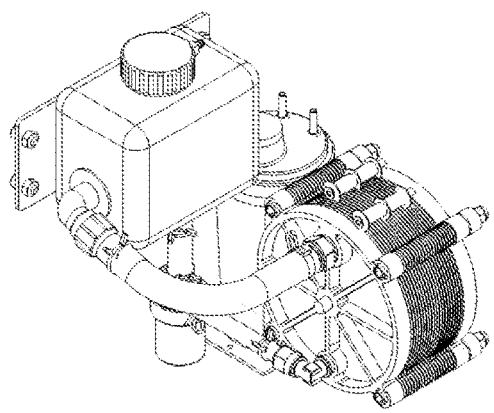
FIG. 3 is a perspective view of the system of FIGS. 1 and 2.

Referring initially to FIGS. 1 to 3, there is illustrated a hydrogen gas generator system according to the invention and indicated generally by the reference numeral 1. The system comprises a reactor stack 2 adapted to perform electrolysis on an electrolyte solution to generate hydrogen gas, a separator tank 3 connected to a top of the reactor stack 2 by means of an electrolyte solution/gas outlet 4 and adapted to receive a mixture of electrolyte solution and gas and separate the gas from the electrolyte solution, an electrolyte solution inlet 5 configured to return electrolyte solution to a bottom of the reactor stack 2, a gas outlet 6 configured to remove gas from the separator tank 3, and a pump 18 for circulating the electrolyte solution.

A reservoir of water 7 is provided in the outlet gas line from separator tank 3, and the gas outlet is configured to bubble gas from the separator tank through the water 7 to help remove residual electrolyte solution from the gas, and to provide protection to the rest of the system from possible flash-back. The gas is then transmitted through tubing (e.g.) to its point of use, for example, by being directed to a nozzle for combustion, or into the air intake of a vehicle engine.

In more detail, and referring to FIGS. 5 to 10, the reactor stack 2 comprises a plurality of stainless steel bi-polar electrode plates 10 separated by spacer plates 11 that define a distance of about 1 mm between the plates and define together with adjacent plates 10 the envelope in which electrolyte solution (not shown) is contained. These plates may be coated with nickel, nickel oxide or other metal oxide to aid in the release of oxygen. Each plate 10 comprises an upper outlet aperture 12 and a lower inlet aperture 13, the outlet aperture being larger than the inlet aperture to facilitate greater volume due to the electrolyte solution at the top of the plates carrying more gas. A terminal electrode plate 15 having a contact tab 16 is provided within the stack for connection to the electrical supply, and two end plates 14 are provided. The inlet apertures 13 are aligned to provide an inlet manifold for electrolyte solution that extends across the base of the plates, and is in fluid communication with the electrolyte solution inlet 5. Likewise, the outlet apertures 12 are aligned to provide an outlet manifold for electrolyte solution that extends across the top of the plates, and is in fluid communication with the electrolyte solution/gas outlet 4. A pump 18 is provided in the electrolyte solution inlet 5 and adapted to pump electrolyte solution in a circuit through the reactor stack, to the separator tank, and back to the reactor stack.

The electrolyte solution for a serial stack is an approximately 1% solution of potassium hydroxide (w/w) in water. The electrolyte solution is maintained at low concentrations, in combination with the close spacing of cell plates, to avoid current leakage issues. The separator tank 3 also acts as a header tank for electrolyte solution, and may be topped up with further water when the electrolyte solution in the system is depleted. The electrical connections to the stack may be provided by a battery, as with vehicular systems, or by use of a Power Supply Unit (PSU) which takes mains AC Voltage and converts it into high current, low Voltage DC. In the case of a vehicle-mounted system, in which the stack is designed for low Voltage with alternating polarity from plate-to-plate, a DC/DC convertor is required to take the 12 or 24 VDC input and convert it to a sub-3 VDC output at high current. In such systems, the electrolyte concentration would be considerably higher, at around 10-25% w/w, as the current leakage issue does not exist in this arrangement.

In use, the system is charged with electrolyte solution, and the pump is actuated which draws the electrolyte solution out of the reservoir, pushing it through the stack (previously described), in which the gas is generated, and back to the separator/reservoir to remove the bubbles generated in the electrolysis reaction. This simple fluid flow circuit is the basic electrolyser.

Figure 4:
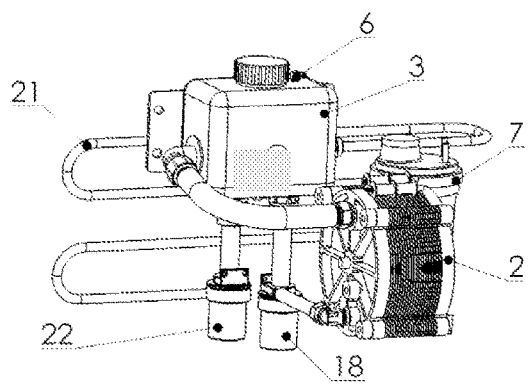
FIG. 4 is a view of a hydrogen gas generator system according to an alternative embodiment of the invention, including an optional secondary cooling circuit which circulates the electrolyte solution in the reservoir through a secondary pumped system to a radiator assembly which may be local to, or somewhat distant from, the rest of the system.
Figure 8:
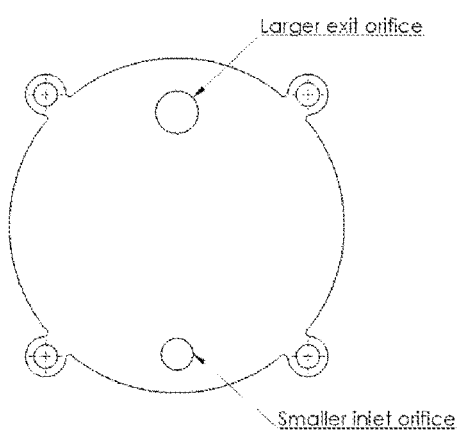
FIG. 8 is a drawing of the metal bi-polar cell plate forming part of a reactor stack of the invention.
Figure 9:
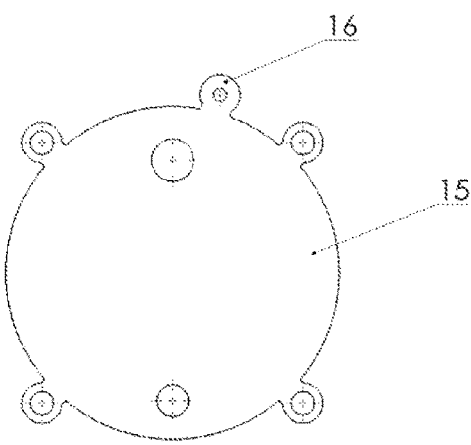
FIG. 9 shows a terminal plate, with its contact tab, forming part of a reactor stack of the invention.
Figure 10:
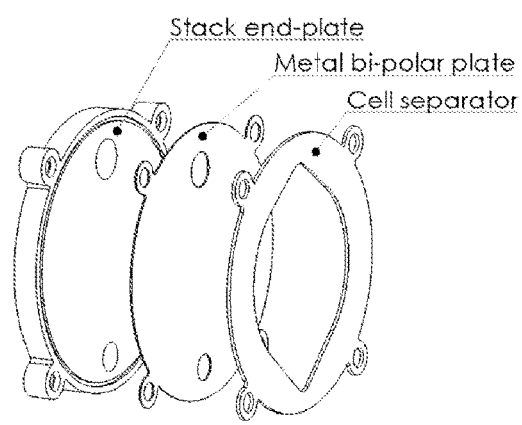
FIG. 10 is an exploded view of a portion of a reactor stack of the invention showing how an end plate, metal bi-polar plate, and spacer cooperate when built into a stack.
Figure 11:
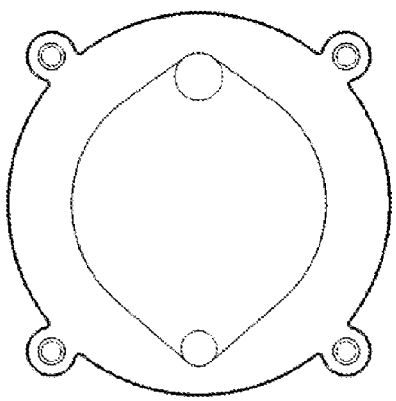
FIG. 11 shows the aligned components in intimate contact with each other, as they would sit when assembled in a stack.

Referring to FIG. 4 there is illustrated a hydrogen gas generator system according to an alternative embodiment of the invention in which parts identified with reference to the previous embodiment are assigned the same reference numerals. In this embodiment, indicated generally by the reference numeral 20, the system comprises a cooling loop 21 and pump 22 which takes electrolyte solution from the reservoir tank and circulates it through the loop 21 to cool the electrolyte solution and dissipate heat generated during the electrolysis process.

Figure 12:
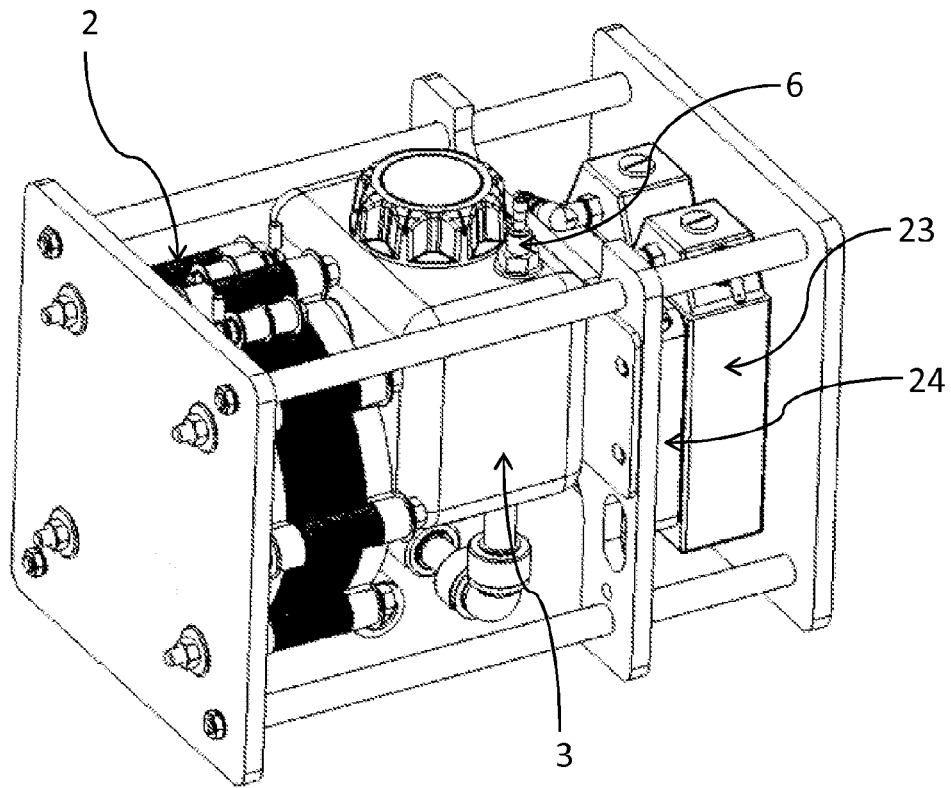
FIG. 12 shows an alternative close-coupled system which incorporates a cooling radiator and fan.

Referring to FIG. 12 there is illustrated a further gas generation system which is close-coupled for compactness, in which parts identified with reference to the previous embodiment are assigned the same reference numerals, and incorporates a radiator 23 and fan 24 which together provide an alternative cooling means for the circulating electrolyte.

OVERVIEW OF THE SYSTEM

The system of this invention consists of a reservoir/header tank with multiple flow-ports, in which a solution of electrolyte solution is contained. The electrolyte in the solution is catalytic, and only the water in which the chosen electrolyte is dissolved is reacted to produce Hydrogen and Oxygen. As the water is depleted by the reaction, it may be topped up to its original dilution from time-to-time, as required.

A pump is provided which draws the electrolyte solution out of the reservoir, pushing it through the stack (previously described), and back to the separator/reservoir to remove the bubbles generated in the electrolysis reaction.

This simple fluid flow circuit is the basic electrolyser.

The process generates heat as a by-product of the reaction which has to be dissipated (dependent upon system configuration, location and environmental conditions) by interruption or supplementation of the flow system with a radiator or heat exchanger.

The bubbler is shown in position, but disconnected from the reservoir. In normal operation, there would be flexible tubes connecting the reservoir outlet to a tube which travels down through the bubbler to a point somewhat spaced from the base of the bubbler. Gas travels down this tube and bubbles through the fluid (normally tap water) and exits the bubbler through the second tube which is shorter, and clear of the fluid contained within the bubbler.

It will be seen that the tube exiting the reactor stack (at the top) is of a larger diameter than the inlet tube at the bottom, which connects to the pump.

As previously described, the stack is designed with greatly improved internal flow characteristics, which allows expansion volume across the cell to accommodate the gas as it is generated. This is accomplished by use of differential flow conduit sizes between top (outlet) and bottom (inlet) ports, in combination with a cell separator/seal which bears a form conducive to improved flow.

The invention provides an electrolyte solution-based electrolyser system which makes use of differential flow volumes for flow bearing gas versus flow which is substantially gas-depleted, having larger flow diameters for gas-bearing fluid than for gas-depleted fluid Typically, the flow is enhanced by use of a pump Suitably, the circulation system incorporates a cooling portion to maintain system temperatures and integrity In one embodiment of this invention, the electric current to each cell is provided to neighbouring metal cell plates in such a way as to alternate polarity from plate-to-plate, said current being supplied at appropriate low Voltage by any means In a second embodiment, electric current is provided to contact plates which are interspaced outside bi-polar plates in a 'serial' configuration, whereby the Voltage is evenly shared between each cell, as a subdivision of the supply Voltage.

Suitably, components are capable of operating at internally induced elevated pressure Typically, the stack comprises cell separators bearing an internal form specified in such a way as to enhance flow across the cell in an even flow pattern, thereby improving mass transport across the cell and ensuring even cooling of the active area of said cell Suitably, cells are closely spaced for use with a low-concentration electrolyte solution The invention is not limited to the embodiment hereinbefore described which may be varied in construction and detail without departing from the spirit of the invention.

What is claimed is:

1. A hydrogen gas generator system comprising:
   a reactor stack adapted to perform electrolysis on an electrolyte solution, the reactor stack comprising a plurality of spaced apart electrode plates adapted to receive electrolyte solution disposed between the plates, each plate having an upper outlet aperture and a lower inlet aperture to allow movement of electrolyte solution across the plates;
   a separator/reservoir configured to receive a mixture of gas and electrolyte solution from a top of the reactor stack and separate the gas from the electrolyte solution;
   a gas outlet configured to remove gas from the separator/reservoir; and
   an electrolyte solution inlet configured to return electrolyte solution from the separator/reservoir to a bottom of the reactor stack,
   characterised in that the system comprises a pump configured to pump electrolyte solution in a circuit from the electrolyte solution inlet, through the reactor stack, and back to the separator/reservoir, and in which in the upper and lower apertures are sufficiently large to allow pumped flow of electrolyte solution through the reactor stack, and wherein the upper apertures are larger than the lower apertures and in which adjacent electrode plates are separated by an annular sealing spacer plate having a substantially lens-shaped opening defining a substantially lens-shaped flow field and which defines a distance of 0.25 to 1.5 mm between the adjacent electrode plates and a path for movement of electrolyte solution between adjacent electrode plates from the lower aperture to the upper aperture.

2. A hydrogen gas generator system as claimed in claim 1 in which the pump is configured to pump electrolyte across the electrode plates at a flow-front velocity of at least 15 cm/minute.

3. A hydrogen gas generator system as claimed in claim 1 in which the pump is configured to pump electrolyte across the electrode plates at a flow-front velocity of at least 20 cm/minute.

4. A hydrogen gas generator system as claimed in claim 1 in which the area of the upper aperture is at least 50% greater than the area of the lower aperture.

5. A hydrogen gas generator system as claimed in claim 1 in which the upper apertures are aligned along a horizontal axis to facilitate transfer of fluid out of the top of the reactor stack.

6. A hydrogen gas generator system as claimed in claim 1 in which the reactor stack comprises an outlet manifold configured to receive pumped fluid from the upper apertures, in which the outlet manifold is a dedicated outlet.

7. A hydrogen gas generator system as claimed in claim 1 in which the electrode plates are contact electrode plates.

8. A hydrogen gas generator system as claimed in claim 1 in which one pair or more of the electrode plates are stainless steel cell plates, which may be coated with nickel or oxide of nickel or other metal oxide.

9. A hydrogen gas generator system as claimed in claim 1 in which the system comprises a cooling loop configured to remove heat from the electrolyte solution, the cooling loop comprising a conduit having an inlet and outlet in fluid communication with the electrolyte reservoir, an intermediate portion distanced from reservoir, and a pump adapted to pump electrolyte through the cooling loop.

10. A hydrogen gas generator system as claimed in claim 1, in which the system comprises a reservoir of liquid and gas drying means configured to pass the gas removed from the separator through the reservoir of liquid in which the gas drying means optionally comprises tubes adapted to bubble the gas through the reservoir of liquid.

11. A hydrogen gas generator system as claimed in claim 1 in which the electrode plates are mono-polar plates or bi-polar plates.

12. A hydrogen gas generator system as claimed in claim 1 wherein the annular sealing spacer plate defines a distance of 0.5 mm between the adjacent electrode plates.

13. A method of generating hydrogen gas which method employs a hydrogen gas generator system of claim 1, the method comprising the steps of pumping an aqueous electrolyte solution through the reactor stack, across the charged plates and to the separator, separating generated gasses from the electrolyte solution in the separator, and pumping the electrolyte back to the reactor stack though the electrolyte inlet.

14. A method as claimed in claim 13 in which the electrolyte solution comprises an aqueous solution of potassium hydroxide.

15. A method as claimed in claim 13 in which the electrolyte solution has a concentration of electrolyte of 0.01 to 5.0% (w/v).

* * * * *